(12) United States Patent
Kim et al.

(10) Patent No.: US 11,606,604 B2
(45) Date of Patent: Mar. 14, 2023

(54) SYSTEM AND METHOD FOR STREAMING VIDEO DATA

(71) Applicant: SAMSUNG ELECTRONICS CO., LTD., Suwon-si (KR)

(72) Inventors: Manseok Kim, Anyang-si (KR); Hyungseok Shim, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 39 days.

(21) Appl. No.: 17/042,590

(22) PCT Filed: Nov. 29, 2018

(86) PCT No.: PCT/KR2018/014901
§ 371 (c)(1),
(2) Date: Sep. 28, 2020

(87) PCT Pub. No.: WO2019/190023
PCT Pub. Date: Oct. 3, 2019

(65) Prior Publication Data
US 2021/0368231 A1    Nov. 25, 2021

(30) Foreign Application Priority Data

Mar. 29, 2018    (KR) .................. 10-2018-0036354

(51) Int. Cl.
*H04N 21/4402*    (2011.01)
*H04N 21/433*    (2011.01)
(Continued)

(52) U.S. Cl.
CPC ......... *H04N 21/4402* (2013.01); *H04L 65/65* (2022.05); *H04L 65/75* (2022.05); *H04N 21/433* (2013.01)

(58) Field of Classification Search
CPC  H04N 21/4402; H04N 21/433; H04L 65/601; H04L 65/608; H04L 65/65; H04L 65/75
See application file for complete search history.

(56) References Cited

U.S. PATENT DOCUMENTS 8,145,779 B2    3/2012    Zhang
8,955,027 B1    2/2015    Dong et al.
(Continued)

FOREIGN PATENT DOCUMENTS

KR    10-2011-0057446    6/2011
KR    10-2012-0117384    10/2012
(Continued)

OTHER PUBLICATIONS

International Search Report for PCT/KR2018/014901, dated Mar. 4, 2019, 4 pages.
(Continued)

*Primary Examiner* — Kristie D Shingles
(74) *Attorney, Agent, or Firm* — Nixon & Vanderhye, P.C.

(57) ABSTRACT

A system according to one embodiment disclosed in the present document may comprise at least one network interface, at least one processor, and at least one storage apparatus, wherein the storage apparatus includes instructions that, when executed, cause the processor to: store uploaded video data in the storage apparatus, without transcoding video data to be streamed; receive a first request for streaming of the video data; when the video data to be streamed at the first request is not available on the storage apparatus, transcode the video data in order to stream same; stream the transcoded video data to a first external device through the interface; receive a second request for streaming of the video (Continued)

data; and stream the stored transcoded video data to a second external device through the interface, without additionally transcoding the video data.

10 Claims, 5 Drawing Sheets

(51) Int. Cl.
*H04L 65/65* (2022.01)
*H04L 65/75* (2022.01)

(56) References Cited

U.S. PATENT DOCUMENTS

| | | | |
|---|---|---|---|
| 9,179,183 | B2 | 11/2015 | Dong et al. |
| 9,225,762 | B2 | 12/2015 | Mack et al. |
| 9,246,842 | B2 | 1/2016 | Oyman et al. |
| 9,544,628 | B2 | 1/2017 | Mack et al. |
| 2005/0002337 | A1 | 1/2005 | Wang et al. |
| 2009/0254672 | A1 | 10/2009 | Zhang |
| 2012/0079054 | A1* | 3/2012 | Moroney ........... H04N 21/4147 709/213 |
| 2013/0286868 | A1 | 10/2013 | Oyman et al. |
| 2014/0036993 | A1 | 2/2014 | Bae |
| 2014/0189141 | A1 | 7/2014 | Kim |
| 2014/0348246 | A1* | 11/2014 | Fu ........................ H04N 19/115 375/240.26 |
| 2015/0143444 | A1 | 5/2015 | Dong et al. |
| 2016/0088331 | A1 | 3/2016 | Mack et al. |
| 2018/0014037 | A1* | 1/2018 | Venkatraman .......... G06F 16/78 |
| 2018/0048599 | A1* | 2/2018 | Arghandiwal .......... H04L 51/16 |
| 2018/0192064 | A1 | 7/2018 | Kim et al. |
| 2019/0253742 | A1* | 8/2019 | Garten ............. H04N 21/25891 |

FOREIGN PATENT DOCUMENTS

| | | |
|---|---|---|
| KR | 10-2014-0086801 | 7/2014 |
| KR | 10-2016-0088957 | 7/2016 |
| KR | 10-1833942 | 3/2018 |
| WO | WO-2016204815 A1 * 12/2016 | ....... H04L 29/06503 |
| WO | WO-2018029471 A1 * 2/2018 | ........... H04L 65/601 |

OTHER PUBLICATIONS

Written Opinion of the ISA for PCT/KR2018/014901, dated Mar. 4, 2019, 6 pages.

* cited by examiner

SYSTEM AND METHOD FOR STREAMING VIDEO DATA

This application is the U.S. national phase of International Application No. PCT/KR2018/014901 filed 29 Nov. 2018, which designated the U.S. and claims priority to KR Patent Application No. 10-2018-0036354 filed 29 Mar. 2018, the entire contents of each of which are hereby incorporated by reference.

FIELD

The disclosure relates to a technology of streaming video data

DESCRIPTION OF RELATED ART

Streaming is a scheme to reproduce voice (audio or audio data) content or a moving picture (video or video data) content in real time without downloading the content.

Recently, a video streaming service has employed HTTP Adaptive Streaming (HAS) technology. According to the HAS technology, which is a technology of transmitting a moving picture (video data) in a chunk (several seconds) unit, the moving picture chuck is re-configured depending on image quality, and transmitted appropriately to a CPU condition and a bandwidth environment of a client terminal, such that the quality and the safety of the moving picture may be ensured. The HAS technology is not standardized yet, and representatively includes Silverlight Smooth Streaming (SSS) from Microsoft, HTTP Dynamic Streaming (HDS) from Adobe, and HTTP Live Streaming (HLS) from Apple.

SUMMARY

Technical Problem

In a real-time streaming service, even if video data, which has been streamed once, is streamed at least two times, whenever a streaming request is received, transcoding has to be performed such that moving picture chucks to be transmitted to a terminal are re-generated. Further, in a general streaming service (e.g., Pseudo streaming), transcoding has to be performed with respect to all video data to generate and store moving picture chucks, which are to be transmitted to the terminal, for each resolution.

According to various embodiments of the disclosure, when a user request for streaming is received, video data is transcoded, stored, and streamed to a client terminal. When a streaming request for the same video data is received, the video data may be streamed to the client terminal without being further transcoded.

According to an embodiment disclosed herein, a system may include at least one network interface, at least one processor operatively connected to the at least one network interface, and at least one storage operatively connected to the processor. The storage may include instructions that when executed, cause the processor to store video data uploaded to the storage without transcoding video data for streaming, receive a first request for streaming the video data from a first external device through the interface, make a first determination regarding whether streaming data associated with the video data is available on the storage, transcode the video data for streaming, when the streaming data is not available on the storage, store video data uploaded to the storage, stream the transcoded video data, which is stored, to the first external device through the interface, receive a second request for streaming the video data from a second external device through the interface, make a second determination regarding whether the streaming data associated with the video data is available on the storage, and stream the transcoded video data, which is stored, to the second external device through the interface, without further transcoding the video data.

In addition, according to an embodiment disclosed herein, a method for streaming video data includes storing video data uploaded to a storage without transcoding video data for streaming, receiving a first request for streaming the video data from a first external device, making a first determination regarding whether the streaming data associated with the video data is available on the storage, transcoding the video data for streaming, when the streaming data is not available on the storage, storing the transcoded video data in the storage, streaming the transcoded video data, which is stored, to the first external device, receiving a second request for streaming the video data from a second external device, making a second determination regarding whether the streaming data associated with the video data is available on the storage, and streaming the transcoded video data, which is stored, to the second external device.

In addition, according to an embodiment disclosed herein, in a storage medium to store computer readable instructions, the instructions cause an electronic device to, when executed by a processor of the electronic device, perform storing video data uploaded to a storage without transcoding video data for streaming, receiving a first request for streaming the video data from a first external device, making a first determination regarding whether the streaming data associated with the video data is available on the storage, transcoding the video data for streaming, when the streaming data is not available on the storage, storing the transcoded video data in the storage, streaming the transcoded video data, which is stored, to the first external device, receiving a second request for streaming the video data from a second external device, making a second determination regarding whether the streaming data associated with the video data is available on the storage, and streaming the transcoded video data, which is stored, to the second external device.

According to embodiments of the disclosure, when video data is uploaded to the server, the streaming service may be instantly provided.

According to embodiments of the disclosure, costs spent to store moving picture chunks converted from the vide data may be reduced.

Besides, a variety of effects directly or indirectly understood through the disclosure may be provided.

With regard to description of drawings, the same or similar denotations may be used for the same or similar components.

DETAILED DESCRIPTION OF EXAMPLE EMBODIMENTS

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

The term "transcoding" may refer to an operation of processing and converting video data to be appropriate to a plurality of network bandwidths, terminal characteristics and performance. For example, the transcoding may be an operation of converting original video data having a UHD resolution produced to have 100 Mbps into video data having an FHD resolution and video data having a HD resolution such that the original video data is able to be reproduced on both a portable phone having an FHD display and a TV having an HD display.

Figure 1:
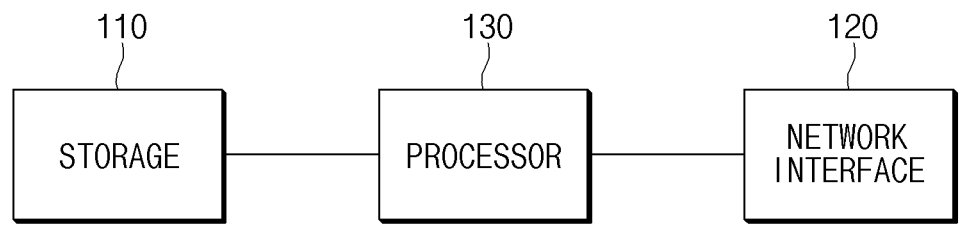
FIG. 1 is a block diagram of a streaming server, according to an embodiment.

FIG. 1 is a block diagram of a streaming server, according to an embodiment.

Referring to FIG. 1, a streaming server may include at least one storage 110, a network interface 120, and at least one processor 130. According to an embodiment, the streaming server may be referred to as a streaming system.

The at least one storage 110 may store video data, transcoded video data, metadata of the video data, and a status value representing the transcoding state of the video data.

According to an embodiment, the at least one storage 110 may store a command or data associated with a component of the streaming server. The at least one storage 110 may store software and/or program.

The network interface 120 may support the communication between the streaming server and a client terminal. According to an embodiment, the network interface 120 may support wired communication and wireless communication. According to an embodiment, the network interface 120 may include various modules to support communication using various networks. For example, the network interface 120 may include a cellular module to support cellular communication such as 2G/3G, LTE, LTE-Advanced (LTE-A), Code Division Multiple Access (CDMA), Wideband CDMA (WCDMA), Universal Mobile Telecommunications System (UMTS), or Wireless Broadband (WiBro). In addition, the network interface 120 may include a Wi-Fi module to support the access to the Internet through an access point (AP) such as Wi-Fi.

The processor 130 may implement various modules by executing instructions stored in the at least one storage 110. For example, the processor 130 may include a streamer and a transcoder. Accordingly, the operation performed by the streamer and the transcoder may be understood as being performed by the processor 130.

Figure 2:
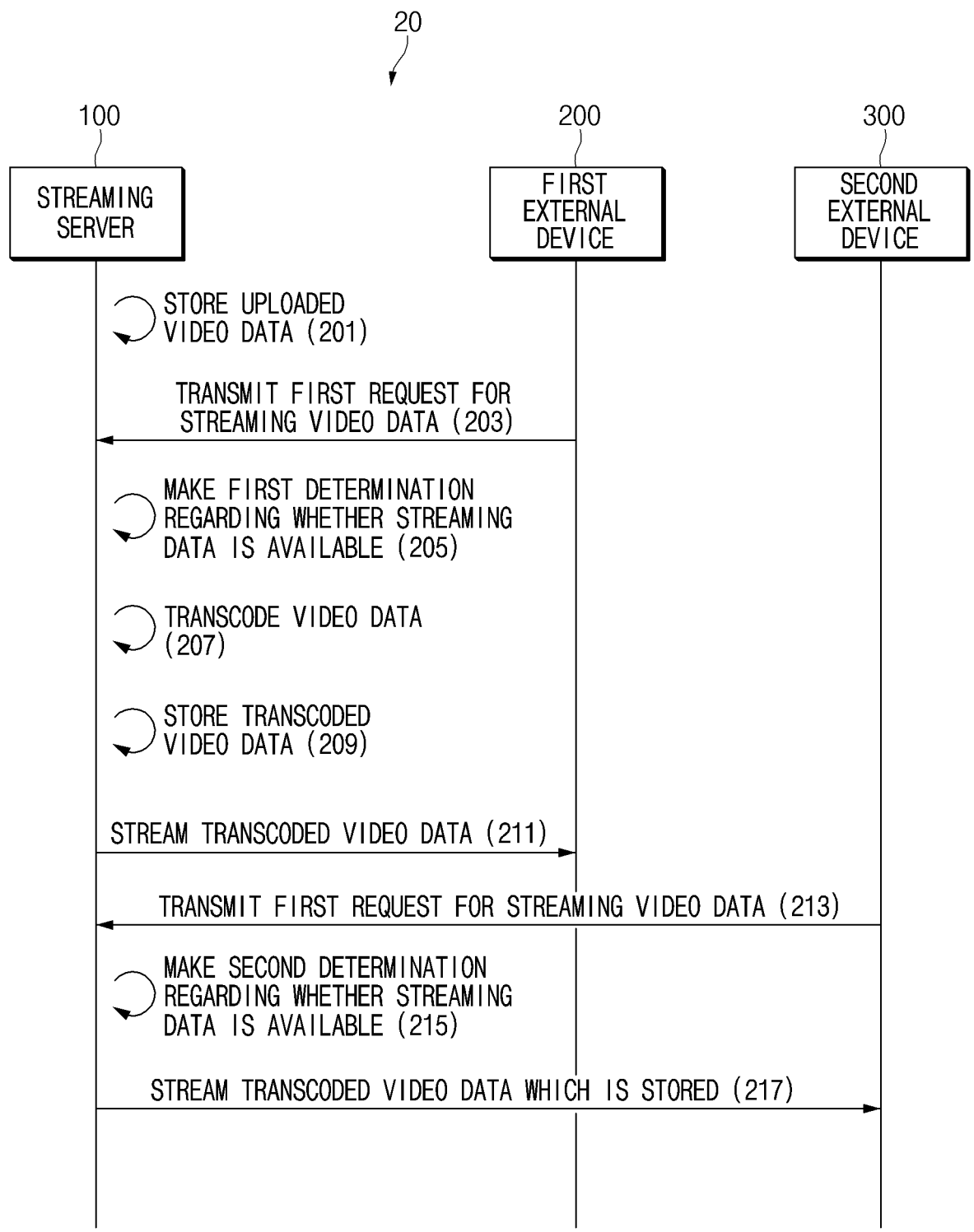
FIG. 2 is a flowchart illustrating a streaming method, according to an embodiment.

FIG. 2 is a flowchart illustrating a streaming method, according to an embodiment.

The following description will be made on the assumption that a streaming server 100, a first external device 200, and a second external device 300 perform the process of FIG. 2. The operation described as being performed by the streaming server 100 may be implemented with instructions which is able to be executed (or performed) by the processor 130 of the streaming server of FIG. 1. The instructions may be stored, for example, in a computer recording medium or the storage 110 of the streaming server illustrated in FIG. 1. According to an embodiment, the first external device 200 and the second external device 300 may include a smartphone, a tablet PC, or a TV.

In operation 201, the processor 130 may store uploaded video data in the storage 110.

According to an embodiment, the processor 130 may not transcode video data for streaming even if the video data is uploaded. In other words, the processor 130 may not transcode the video data in advance until receiving a streaming request.

In operation 203, the processor 130 may receive, from the first external device, a first request for streaming the video data through the at least one network interface 120.

According to an embodiment, the first request may include an identifier for identifying the video data. For example, the identifier may include a hash value.

In operation 205, the processor 130 may make a first determination regarding whether streaming data associated with the video data is available on the at least one storage 110.

According to an embodiment, the at least one storage 110 may store a status value representing a transcoding state of the video data corresponding to the identifier (for example, hash value). According to an embodiment, the status value may represent that the video data is not transcoded, transcoding of the video data is in progress, or the transcoding of the video data is completed.

According to an embodiment, the processor 130 may make the first determination regarding whether the streaming data associated with the video data is available on the storage 110, based on the status value corresponding to the identifier included in the first request.

According to an embodiment, when the status value represents that the video data is not transcoded, the processor 130 may determine that the streaming data associated with the video data is not available on the at least one storage 110.

According to an embodiment, when the status value represents that the transcoding of the video data is in progress or the transcoding of the video data is completed, the processor 130 may determine that the streaming data associated with the video data is available on the at least one storage 110.

According to an embodiment, when the streaming data associated with the video data is not available, the processor 130 may transcode the video data stored in the at least one storage 110 in operation 207.

According to an embodiment, the processor 130 may change the status value for representing the transcoding state of the video data stored in the storage 110 to a value for representing that transcoding is in progress.

According to an embodiment, the processor 130 may transcode the video data using Http Live Streaming (HLS) protocol. According to various embodiments, the processor 130 may transcode the video data using a protocol, such as Silverlight Smooth Streaming (SSS) or HTTP Dynamic Streaming (HDS), as well as the HLS protocol.

According to an embodiment, the processor 130 may generate a plurality of video data chunks, which are transcoded, from the video data.

In operation 209, the processor 130 may store the transcoded video data in the at least one storage 110.

According to an embodiment, the processor 130 may change the status value representing the transcoding status of the video data stored in the storage 110 to a value representing that the transcoding is completed, when the transcoding of the video data is completed and the video data is all stored.

According to an embodiment, the processor 130 may store a list of a plurality of video data chunks in the at least one storage 110, when generating the plurality of transcoded video data chunks.

According to an embodiment, the processor 130 may store metadata, which is associated with the transcoded video data, in the at least one storage 110, while storing the transcoded video data.

According to an embodiment, the metadata may include at least one of resolution, a length, a bit rate, a frame rate, a video codec, a video codec string, an audio codec, a final reproduction time of a frame, or error information of the transcoded video data.

In operation 211, the processor 130 may stream the transcoded video data, which is stored, to the first external device through the at least one network interface 120.

According to an embodiment, the processor 130 may transmit, to the first external device, a plurality of streaming URLs based on a plurality of resolutions, which are included, in the metadata, of the video data. For example, when the resolution of the original video data is FHD, the processor 130 may transmit, to the first external device, three streaming URLs based on the FHD, HD, and SD.

According to an embodiment, the processor 130 may receive, from the first external device, a request for streaming video data depending on one streaming URL of the plurality of streaming URLs through the network interface 120. For example, the processor 130 may receive a request for streaming video data depending on a streaming URL based on the HD.

According to an embodiment, the processor 130 may stream, to the first external device, transcoded video data having the resolution corresponding to one streaming URL through the network interface 120. For example, the processor 130 may stream, to the first external device, the transcoded video data having the HD resolution.

According to an embodiment, the processor 130 may transmit, to the first external device, a plurality of streaming URLs based on a plurality of frame rates, which are included in the metadata, of the video data. For example, when the frame rate of the original video data is 60p, the processor 130 may transmit, to the first external device, two streaming URLs corresponding to the 30p and 60p, respectively.

According to an embodiment, the processor 130 may receive, from the first external device, a request for streaming video data depending on one streaming URL of the plurality of streaming URLs through the network interface 120. For example, the processor 130 may receive a request for streaming video data depending on a streaming URL corresponding to the 60p.

According to an embodiment, the processor 130 may stream, to the first external device, transcoded video data having a frame rate corresponding to one streaming URL through the network interface 120. For example, the processor 130 may stream, to the first external device, the transcoded video data having the frame rate of 60p.

In operation 213, the processor 130 may receive a second request for streaming video data from the second external device, through at least one network interface 120.

According to an embodiment, the second request from the second external device may be the same as the first request from the first external device. In other words, the video data requested by the second external device may be the same as the video data requested by the first external device.

In operation 215, the processor 130 may make a second determination regarding whether streaming data associated with the video data is available on the at least one storage 110.

According to an embodiment, the video data is transcoded and stored in the at least one storage 110 in operation 209.

According to an embodiment, the processor 130 may determine whether streaming data associated with the video data is available, based on the status value representing the transcoding status of the video data. According to an embodiment, in operation 209, the status value may be changed to a value representing that the transcoding is completed. The processor 130 may determine that the streaming data associated with the video data is available on the at least one storage 110, based on the status value.

According to an embodiment, when determining that the streaming data associated with the video data is available on the at least one storage 110, the processor 130 may stream, to the second external device, the transcoded video data stored in the at least one storage 110 in operation 217. According to an embodiment, the processor 130 may stream, to the second electronic device, the transcoded video data without additional transcoding of the video data.

Figure 3:
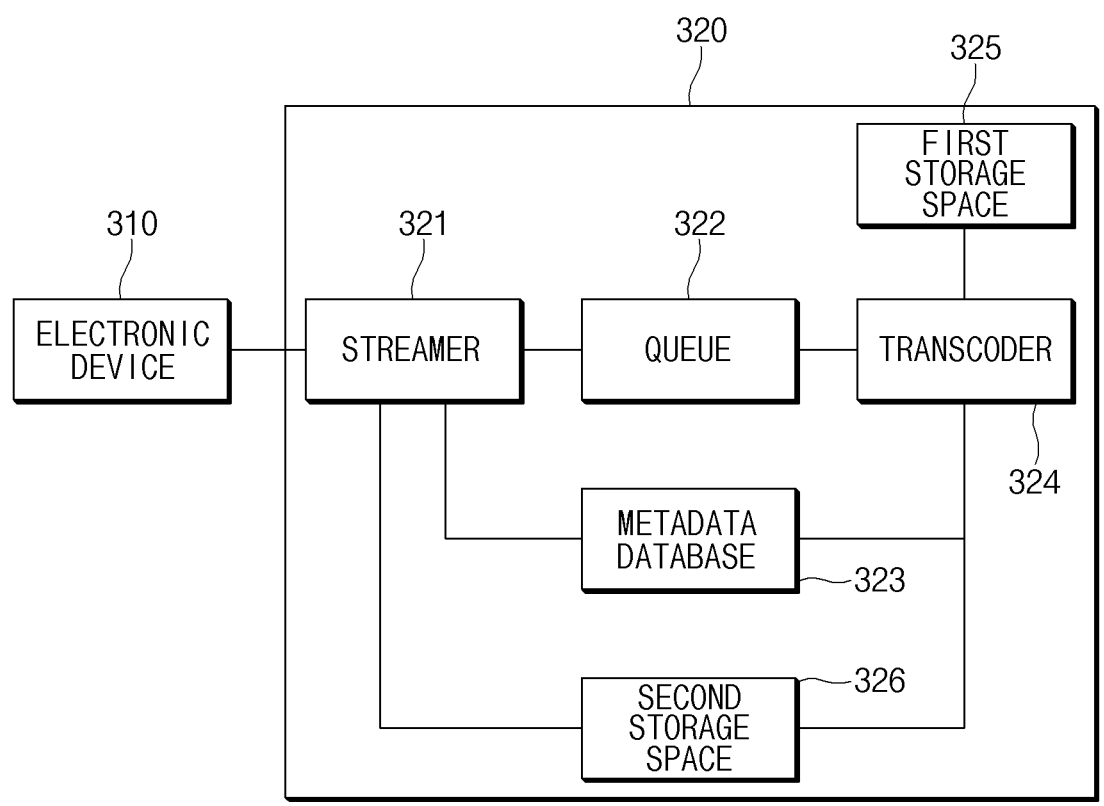
FIG. 3 is a block diagram illustrating an electronic device and a streaming server, according to an embodiment.

FIG. 3 is a block diagram illustrating an electronic device and a streaming server, according to an embodiment.

According to an embodiment, a streaming server 320 may include a streamer 321, a queue 322, a metadata database 323, a transcoder 324, a first storage space 325, and a second storage space 326. According to an embodiment, the processor 130 may implement the streamer 321 and the transcoder 324 by executing instructions stored in the at least one storage. Accordingly, the operations performed by the streamer 321 and the transcoder 324 may be understood as being performed by the processor 130. According to an embodiment, the queue 322, the metadata database 323, the first storage space 325, and the second storage space 326 may be included in the at least one storage 110.

According to an embodiment, the streamer 321 may communicate with an electronic device 310 which is outside. According to an embodiment, the queue 322 may store a transcoding request. According to an embodiment, the metadata database 323 may store a status value representing a transcoding status of video data and metadata of the video data. According to an embodiment, the transcoder 324 may transcode original video data. According to an embodiment, the first storage space 325 may store the original video data. According to an embodiment, the second storage space 326 may store video data transcoded by the transcoder 324

Operations described with reference to FIG. 3 may correspond to operations described with reference to FIG. 2. According to an embodiment, the first storage space 325 may store original video data that is not transcoded (operation 201).

According to an embodiment, the streamer 321 may receive a first request for streaming video data from the electronic device 310 (operation 203). In present embodiment, it is assumed that the first request is the beginning request for streaming video data.

According to an embodiment, the first request may include an identifier (e.g., hash value) for identifying the video data.

Regarding the streamer 321 of the streaming server 320, a processor may determine whether streaming data associated with the video data is available on the at least one second storage space 326, in response to the reception of the first request (operation 205). According to an embodiment, the streamer 321 may determine whether the streaming data associated with the video data is available, based on a status value stored in the metadata database 323 using an identifier (e.g., the hash value).

According to an embodiment, since the video data is not transcoded, the streamer 321 may determine that the streaming data associated with the video data is not available on the second storage space 326. Since the streaming data is not available, the streamer 321 may transmit the request for transcoding of the video data to the queue 322. The queue 322 may store a transcoding request, and may transmit the stored transcoding request to the transcoder 324.

According to an embodiment, the transcoder 324 may transcode the original video data stored in the first storage space 325 (operation 207). According to an embodiment, the transcoder 324 may change the status value for representing the transcoding state of the video data stored in the metadata database 323 to a value for representing that transcoding is in progress.

According to an embodiment, the transcoder 324 may store, in the second storage space 326, moving picture chunks of the transcoded video data in the second storage space 326 (operation 209).

According to an embodiment, the transcoder 324 may change the status value, which is stored in the metadata database 323, representing the transcoding status of the video data to a value representing the transcoding completed, when the transcoding of the video data is completed and the video data is all stored.

According to an embodiment, the streamer 321 may determine that the transcoded video data is stored in the second storage space 326, based on at least one of a status value or metadata of the video data stored in the metadata database 323.

According to an embodiment, the streamer 321 may stream, to the electronic device 310, moving picture chucks of the transcoded video data stored in the second storage space 326.

According to an embodiment, the streamer 321 may stream, to the electronic device 310, moving picture chucks even if the transcoder 324 is transcoding the video data. For example, when five moving picture chunks are to be transcoded and generated by the transcoder 324, even though only three moving picture chunks are generated among the five moving picture chunks, the streamer 321 may sequentially stream the moving picture chucks which have been already generated. According to an embodiment, the transcoder 324 may continuously transcode the remaining portion of video data while the streamer 321 is streaming the moving picture chunks which have been already generated.

According to an embodiment, the streamer 321 may transmit, to the electronic device 310, a plurality of streaming URLs based on a plurality of resolutions, which are included in the metadata, of the video data. According to an embodiment, the streamer 321 may receive a request for streaming video data based on one streaming URL of a plurality of streaming URLs, from the electronic device 310. According to an embodiment, the streamer 321 may stream, to the electronic device 310, the transcoded video data having the resolution corresponding to the one streaming URL through a network interface.

According to an embodiment, the streamer 321 may receive a second request for streaming video data, from the electronic device 310 (operation 203). It is assumed that the second request is a request for streaming video data based on the first request.

Regarding the streamer 321, a processor may determine whether streaming data associated with the video data is available on the at least one second storage space 326, in response to the reception of the second request (operation 205). According to an embodiment, the streamer 321 may determine whether streaming data associated with the video data is available, based on a status value stored in the metadata database 323 using an identifier (e.g., the hash value).

According to an embodiment, the status value representing the transcoding state of the video data may represent that transcoding is completed. The streamer 321 may determine that the streaming data associated with the video data is available in the second storage space 326, based on the status value.

According to an embodiment, the streamer 321 may determine that the streaming data associated with the video data is available, and may stream, to the electronic device 310, the transcoded the video data stored in the second storage space 326. In this case, the streamer 321 may not transmit the transcoding request of the video data into the queue 322.

Figure 4:
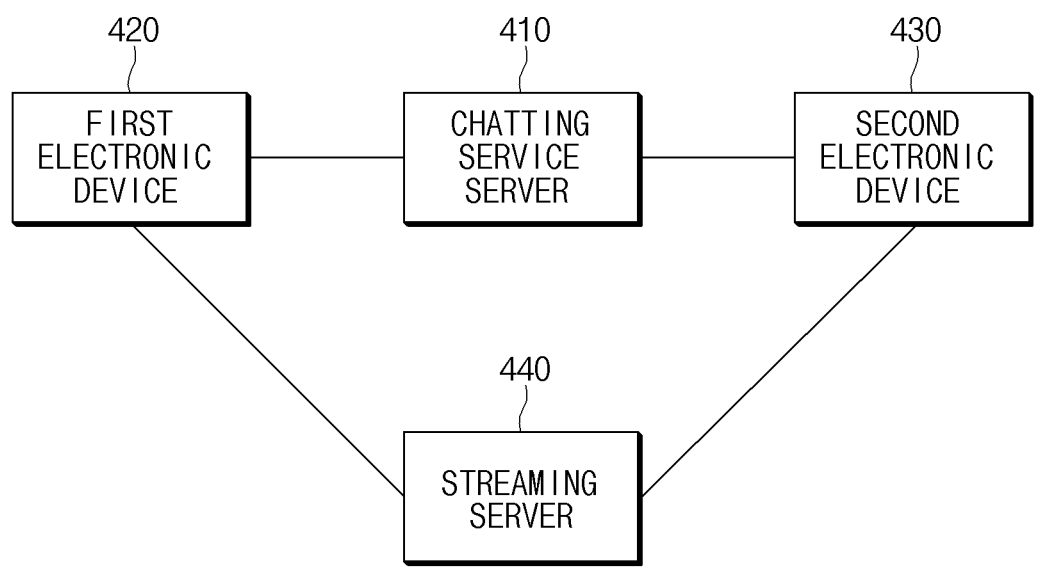
FIG. 4 is a block diagram illustrating a chatting service server and a streaming server connected to a plurality of electronic devices, according to an embodiment.

FIG. 4 is a block diagram illustrating a chatting service server and a streaming server connected to a plurality of electronic devices, according to an embodiment.

According to an embodiment, a chatting service server 410 may be a server 410 for an application to provide a chatting service between a plurality of electronic devices. According to an embodiment, the chatting service server 410 may provide a service for sharing a moving picture.

According to an embodiment, a first electronic device 420 may correspond to the first external device 200 of FIG. 2, and a second electronic device 430 may correspond to the second external device 300 of FIG. 2. A streaming server 440 may correspond to the streaming server 100 of FIG. 2.

According to various embodiments, the first electronic device 420 may transmit video data to the chatting service server 410. The second electronic device 430 may receive video data transmitted by the first electronic device 420, from the chatting service server 410.

According to an embodiment, the first electronic device 420 may transmit the video data to the streaming server 440, and the streaming server 440 may store the received video data into an area for the first electronic device 420 of the first storage space.

According to an embodiment, the second electronic device 430 may transmit, to the streaming server 440, video data received from the chatting service server 410, and the streaming server 440 may store the received video data in an area for the second electronic device 420 of the first storage space.

According to an embodiment, the video data received to the streaming server 440 from the first electronic device 420 may be the same as video data received from the second electronic device 430. According to an embodiment, since two pieces of video data are the same, the identifiers (e.g., hash values) of the two pieces of video data may be the same.

Thereafter, the first electronic device 420 may request streaming of the video data to the streaming server 440. According to an embodiment, the streaming request may be the first request, and the streaming server 440 may determine that the streaming data of the video data of the streaming server 440 is not available. According to an embodiment, the streaming server 440 may determine that the streaming data of the video data is not available, based on that the identifier of the video data is not included in the metadata base.

Accordingly, the streamer of the streaming server may transmit a request for transcoding to the queue.

According to an embodiment, the transcoder of the streaming server 440 may transcode original video data and may store moving picture chunks of the transcoded video data in the second storage space of the streaming server 440. The second storage space may transmit the stored moving picture chunks of the transcoded video data to the streamer, and the streamer may stream, to the first electronic device 420, the moving picture chunks of the transcoded video data.

According to an embodiment, after the streaming service is provided to the first electronic device 420, the second electronic device 430 may transmit a request for streaming of the video data to the streaming server 440. According to an embodiment, the request of the second electronic device 430 may include an identifier of the video data, and the streaming server 440 may determine that the streaming data of the video data having the same identifier as the identifier included in the request is available. According to an embodiment, the streaming server 440 may determine that the streaming data of the video data is available, based on that the identifier of the video data is included in the metadata base. This is because the identifier of the video data uploaded by the first electronic device 420 is the same as the identifier of the video data uploaded by the second electronic device 430.

The streaming server 440 may stream, to the second electronic device 430, moving picture chunks of the transcoded video data, which is previously stored in the second storage space, in response to the request by the second electronic device 430. According to an embodiment, the streaming server 440 may stream, to the second electronic device 430, the transcoded video data which is previously stored, without additionally transcoding the video data, which is requested for streaming by the second electronic device 430.

Figure 5:
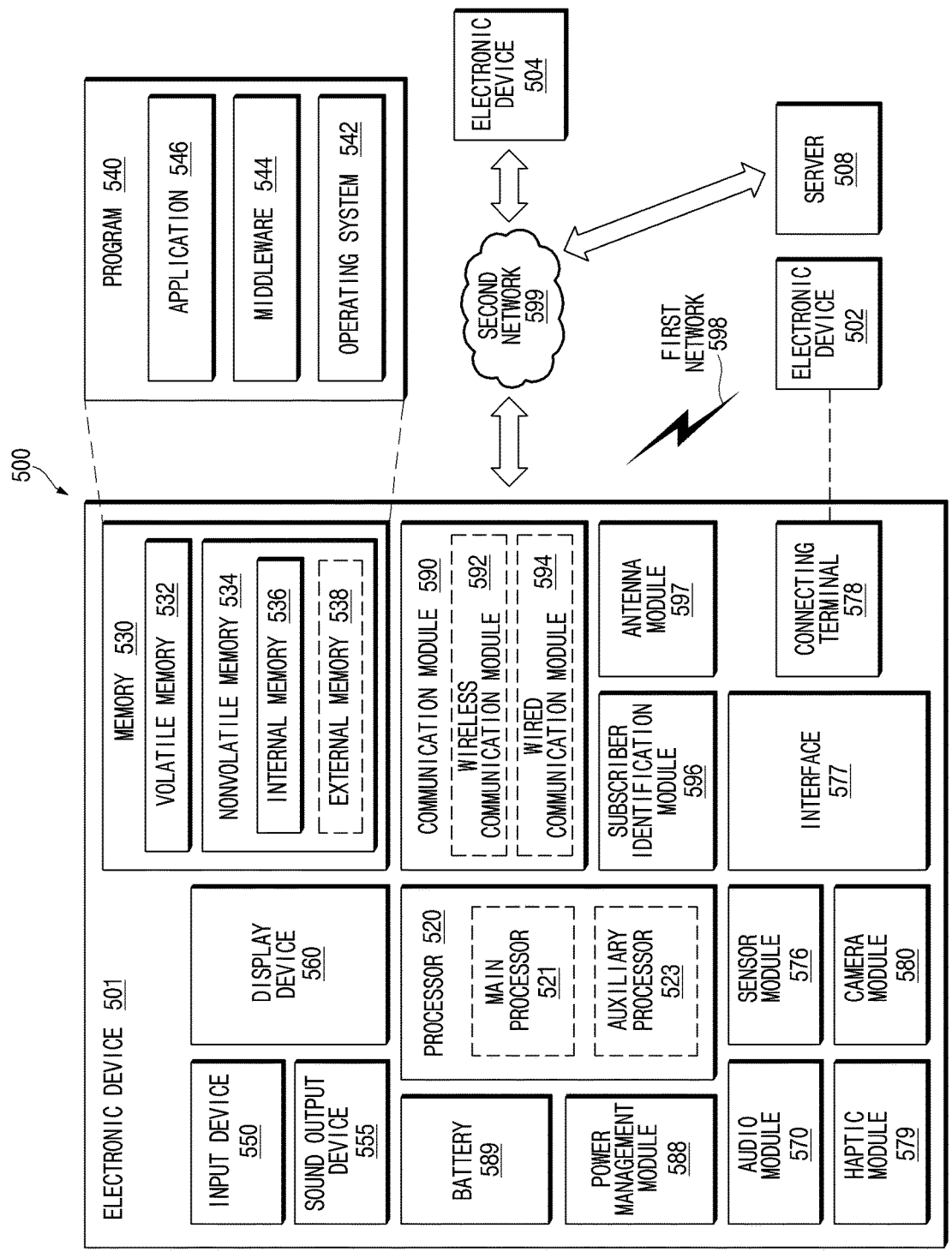
FIG. 5 is a block diagram of an electronic device in a network environment according to various embodiments.

FIG. 5 is a block diagram of an electronic device in a network environment according to various embodiments. Referring to FIG. 5, an electronic device 501 (e.g., the electronic device 310 or the first electronic device 420) may communicate with an electronic device 502 (e.g. the second electronic device 430) through a first network 598 (e.g., a short-range wireless communication) or may communicate with an electronic device 504 or a server 508 (e.g., streaming server 320 or streaming server 440) through a second network 599 (e.g., a long-distance wireless communication) in a network environment 500. According to an embodiment, the electronic device 501 may communicate with the electronic device 504 through the server 508. According to an embodiment, the electronic device 501 may include a processor 520, a memory 530, an input device 550, a sound output device 555, a display device 560, an audio module 570, a sensor module 576, an interface 577, a haptic module 579, a camera module 580, a power management module 588, a battery 589, a communication module 590, a subscriber identifier module 596, and an antenna module 597. According to some embodiments, at least one (e.g., the display device 560 or the camera module 580) among components of the electronic device 501 may be omitted or other components may be added to the electronic device 501. According to some embodiments, some components may be integrated and implemented as in the case of the sensor module 576 (e.g., a fingerprint sensor, an iris sensor, or an illuminance sensor) embedded in the display device 560 (e.g., a display).

The processor 520 may operate, for example, software (e.g., a program 540) to control at least one of other components (e.g., a hardware or software component) of the electronic device 501 connected to the processor 520 and may process and compute a variety of data. The processor 520 may load a command set or data, which is received from other components (e.g., the sensor module 576 or the communication module 590), into a volatile memory 532, may process the loaded command or data, and may store result data into a nonvolatile memory 534. According to an embodiment, the processor 520 may include a main processor 521 (e.g., a central processing unit or an application processor) and an auxiliary processor 523 (e.g., a graphic processing device, an image signal processor, a sensor hub processor, or a communication processor), which operates independently from the main processor 521, additionally or alternatively uses less power than the main processor 521, or is specified to a designated function. In this case, the auxiliary processor 523 may operate separately from the main processor 521 or embedded.

In this case, the auxiliary processor 523 may control, for example, at least some of functions or states associated with at least one component (e.g., the display device 560, the sensor module 576, or the communication module 590) among the components of the electronic device 501 instead of the main processor 521 while the main processor 521 is in an inactive (e.g., sleep) state or together with the main processor 521 while the main processor 521 is in an active (e.g., an application execution) state. According to an embodiment, the auxiliary processor 523 (e.g., the image signal processor or the communication processor) may be implemented as a part of another component (e.g., the camera module 580 or the communication module 590) that is functionally related to the auxiliary processor 523. The memory 530 may store a variety of data used by at least one component (e.g., the processor 520 or the sensor module 576) of the electronic device 501, for example, software (e.g., the program 540) and input data or output data with respect to commands associated with the software. The memory 530 may include the volatile memory 532 or the nonvolatile memory 534.

The program 540 may be stored in the memory 530 as software and may include, for example, an operating system 542, a middleware 544, or an application 546.

The input device 550 may be a device for receiving a command or data, which is used for a component (e.g., the processor 520) of the electronic device 501, from an outside (e.g., a user) of the electronic device 501 and may include, for example, a microphone, a mouse, or a keyboard.

The sound output device 555 may be a device for outputting a sound signal to the outside of the electronic device 501 and may include, for example, a speaker used for general purposes, such as multimedia play or recordings play, and a receiver used only for receiving calls. According to an embodiment, the receiver and the speaker may be either integrally or separately implemented.

The display device 560 may be a device for visually presenting information to the user of the electronic device 501 and may include, for example, a display, a hologram device, or a projector and a control circuit for controlling a corresponding device. According to an embodiment, the display device 560 may include a touch circuitry or a pressure sensor for measuring an intensity of pressure on the touch.

The audio module 570 may convert a sound and an electrical signal in dual directions. According to an embodiment, the audio module 570 may obtain the sound through the input device 550 or may output the sound through an external electronic device (e.g., the electronic device 502

(e.g., a speaker or a headphone)) wired or wirelessly connected to the sound output device 555 or the electronic device 501.

The sensor module 576 may generate an electrical signal or a data value corresponding to an operating state (e.g., power or temperature) inside or an environmental state outside the electronic device 501. The sensor module 576 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 577 may support a designated protocol wired or wirelessly connected to the external electronic device (e.g., the electronic device 502). According to an embodiment, the interface 577 may include, for example, an HDMI (high-definition multimedia interface), a USB (universal serial bus) interface, an SD card interface, or an audio interface.

A connecting terminal 578 may include a connector that physically connects the electronic device 501 to the external electronic device (e.g., the electronic device 502), for example, an HDMI connector, a USB connector, an SD card connector, or an audio connector (e.g., a headphone connector).

The haptic module 579 may convert an electrical signal to a mechanical stimulation (e.g., vibration or movement) or an electrical stimulation perceived by the user through tactile or kinesthetic sensations. The haptic module 579 may include, for example, a motor, a piezoelectric element, or an electric stimulator.

The camera module 580 may shoot a still image or a video image. According to an embodiment, the camera module 580 may include, for example, at least one lens, an image sensor, an image signal processor, or a flash.

The power management module 588 may be a module for managing power supplied to the electronic device 501 and may serve as at least a part of a power management integrated circuit (PMIC).

The battery 589 may be a device for supplying power to at least one component of the electronic device 501 and may include, for example, a non-rechargeable (primary) battery, a rechargeable (secondary) battery, or a fuel cell.

The communication module 590 may establish a wired or wireless communication channel between the electronic device 501 and the external electronic device (e.g., the electronic device 502, the electronic device 504, or the server 508) and support communication execution through the established communication channel. The communication module 590 may include at least one communication processor operating independently from the processor 520 (e.g., the application processor) and supporting the wired communication or the wireless communication. According to an embodiment, the communication module 590 may include a wireless communication module 592 (e.g., a cellular communication module, a short-range wireless communication module, or a GNSS (global navigation satellite system) communication module) or a wired communication module 594 (e.g., an LAN (local area network) communication module or a power line communication module) and may communicate with the external electronic device using a corresponding communication module among them through the first network 598 (e.g., the short-range communication network such as a Bluetooth, a WiFi direct, or an IrDA (infrared data association)) or the second network 599 (e.g., the long-distance wireless communication network such as a cellular network, an internet, or a computer network (e.g., LAN or WAN)). The above-mentioned various communication modules 590 may be implemented into one chip or into separate chips, respectively.

According to an embodiment, the wireless communication module 592 may identify and authenticate the electronic device 501 using user information stored in the subscriber identifier module 596 in the communication network.

The antenna module 597 may include one or more antennas to transmit or receive the signal or power to or from an external source. According to an embodiment, the communication module 590 (e.g., the wireless communication module 592) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 501 and the external electronic device 504 through the server 508 connected to the second network 599. Each of the electronic devices 502 and 504 may be the same or different types as or from the electronic device 501. According to an embodiment, all or some of the operations performed by the electronic device 501 may be performed by another electronic device or a plurality of external electronic devices. When the electronic device 501 performs some functions or services automatically or by request, the electronic device 501 may request the external electronic device to perform at least some of the functions related to the functions or services, in addition to or instead of performing the functions or services by itself. The external electronic device receiving the request may carry out the requested function or the additional function and transmit the result to the electronic device 501. The electronic device 501 may provide the requested functions or services based on the received result as is or after additionally processing the received result. To this end, for example, a cloud computing, distributed computing, or client-server computing technology may be used.

According to an embodiment disclosed herein, a system may include at least one network interface, at least one processor operatively connected to the at least one network interface, and at least one storage operatively connected to the processor. The storage may include instructions that when executed, cause the processor to store video data uploaded to the storage without transcoding video data for streaming, receive a first request for streaming the video data from a first external device through the interface, make a first determination regarding whether streaming data associated with the video data is available on the storage, transcode the video data for streaming, when the streaming data is not available on the storage, store video data uploaded to the storage, stream the transcoded video data, which is stored, to the first external device through the interface, receive a second request for streaming the video data from a second external device through the interface, make a second determination regarding whether the streaming data associated with the video data is available on the storage, and stream the transcoded video data, which is stored, to the second external device through the interface, without further transcoding the video data.

According to an embodiment, the network interface may include at least one a wireless communication circuit, or a wireless communication circuit.

According to an embodiment, the instructions may cause the processor to transcode the video data using an http live streaming (HLS) protocol.

According to an embodiment, the transcoded video data may include a plurality of video data chunks, and the instructions may cause the processor to further store a list of the plurality of video data chunks in the storage.

According to an embodiment, the first request may include an identifier for identifying the video data.

According to an embodiment, the storage device may store a status value representing a transcoding state of the video data corresponding to the identifier, and the instructions cause the processor to make a first determination based on the status value corresponding to the identifier included in the first request, and make a second determination based on the status value corresponding to the identifier included in the second request.

According to an embodiment, the instructions may cause the processor to determine that the streaming data associated with the video data is not available on the storage device, when the status value represents that the video data is not transcoded, and determine that the streaming data associated with the video data is available on the storage, when the status value represents that transcoding of the video data is in progress or the transcoding of the video data is completed.

According to an embodiment, the instructions cause the processor to store metadata associated with the video data in the storage, while storing the video data.

According to an embodiment, the instructions may cause the processor to, the metadata may include at least one of resolution, a length, a bit rate, a frame rate, a video codec, a video codec string, an audio codec, a final reproduction time of a frame, or the transcoded error information of the video data.

According to an embodiment, the instructions may cause the processor to transmit, to the first external device, a plurality of streaming URLs based on a plurality of resolutions, which are included in the metadata, of the video data, through the network interface, receive, from the first external device, a request for streaming video data based on one streaming URL of the plurality of streaming URLs through the network interface, and stream, to the first external device, the transcoded video data having resolution corresponding to the one streaming URL through the network interface.

According to an embodiment, the instructions may cause the processor to: transmit, to the first external device, a plurality of streaming URLs based on a plurality of frame rates, which are included in the metadata, of the video data, receive, from the first external device, a request for streaming video data based on one streaming URL of the plurality of streaming URLs through the network interface, and stream, to the first external device the transcoded video data having a frame rate corresponding to the one streaming URL.

According to an embodiment, the instructions may cause the processor to transmit, to the second external device, a plurality of streaming URLs based on a plurality of resolutions, which are included in the metadata, of the video data, receive, from the second external device, a request for streaming video data based on one streaming URL of the plurality of streaming URLs, and stream, to the second external device, the transcoded video data having resolution corresponding to the one streaming URL.

According to an embodiment, the instructions may cause the processor to transmit, to the first external device, a plurality of streaming URLs based on a plurality of frame rates, which are included in the metadata, of the video data, receive, from the second external device, a request for streaming video data based on one streaming URL of the plurality of streaming URLs, and stream, to the second external device, the transcoded video data having a frame rate corresponding to the one streaming URL.

According to an embodiment, the instructions may cause the processor to store a time point at which the transcoded video data is streamed, in the storage, and delete the transcoded video data from the storage when a specified time is elapsed after a last time point at which the video data is streamed.

In addition, according to an embodiment disclosed herein, a method for streaming video data includes storing video data uploaded to a storage without transcoding video data for streaming, receiving a first request for streaming the video data from a first external device, making a first determination regarding whether streaming data associated with the video data is available on the storage, transcoding the video data for streaming, when the streaming data is not available on the storage, storing the transcoded video data in the storage, streaming the transcoded video data, which is stored, to the first external device, receiving a second request for streaming the video data from a second external device, making a second determination regarding whether the streaming data associated with the video data is available on the storage, and streaming the transcoded video data, which is stored, to the second external device.

According to an embodiment, the first request may include an identifier for identifying the video data.

According to an embodiment, the storage device may store a status value representing a transcoding state of the video data corresponding to the identifier, and the making of the first determination may include making the first determination based on the status value corresponding to the identifier included in the first request.

The making of the second determination may include making the second determination based on the status value corresponding to the identifier included in the second request.

According to an embodiment, the making of the first determination and the making of the second determination may include determining that the streaming data associated with the video data is not available on the storage, when the status value represents that the video data is not transcoded, and determining that the streaming data associated with the video data is available on the storage, when the status value represents that the transcoding of the video data is in progress or the transcoding of the video data is completed.

According to an embodiment, the storing of the transcoded video data in the storage may include storing metadata associated with the transcoded video data in the storage.

In addition, according to an embodiment disclosed herein, in a storage medium to store computer readable instructions, the instructions cause an electronic device to, when executed by a processor of the electronic device, perform storing video data uploaded to a storage without transcoding video data for streaming, receiving a first request for streaming the video data from a first external device, making a first determination regarding whether the streaming data associated with the video data is available on the storage, transcoding the video data for streaming, when the streaming data is not available on the storage, storing the transcoded video data in the storage, streaming the transcoded video data, which is stored, to the first external device, receiving a second request for streaming the video data from a second external device, making a second determination regarding whether the streaming data associated with the video data is available on the storage, and streaming the transcoded video data, which is stored, to the second external device.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 540) including an instruction stored in a machine-readable storage media (e.g., an internal memory 536 or an external memory 538) readable by a machine (e.g., a computer). The machine may be a device that calls the instruction from the machine-readable storage media and operates depending on the called instruction and may include the electronic device (e.g., the electronic device 501). When the instruction is executed by the processor (e.g., the processor 520), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

The invention claimed is:

1. A server comprising:
a communication circuit;
a storage;
at least one processor operatively connected to the communication circuit and the storage; and
a memory operatively connected to the processor,
wherein the storage stores a status value representing the transcoding state of video data, and
wherein the memory includes instructions that when executed by the at least one processor, cause the server to:
store video data uploaded to the storage without transcoding video data for a streaming service,
receive a first request for streaming the video data from a first external device through the communication circuit, the first request including a identifier for identifying the video data,
make a first determination regarding whether streaming data associated with the video data is available on the storage, based on the status value corresponding to the identifier included in the first request,
transcode the video data for streaming, when the status value represents that the transcoding state of the video data corresponding to the identifier represents that the transcoding of the video data is not transcoded,
store the transcoded video data in the storage,
stream the transcoded video data, which is stored, to the first external device through the communication circuit,
receive a second request for streaming the video data from a second external device through the communication circuit, the second request including the same identifier as the identifier included in the first request, make a second determination regarding whether the streaming data associated with the video data is available on the storage device, based on the status value corresponding to the identifier included in the second request, and stream pre-transcoded video data, which is stored, to the second external device through the communication circuit without further transcoding the video data, when the status value represents that the transcoding state of the video data corresponding to the identifier represents that the transcoding of the video data is in progress or completed.

2. The server of claim 1, wherein the instructions cause the server to:

transcode the video data using an http live streaming (HLS) protocol.

3. The server of claim 1, wherein the transcoded video data includes a plurality of video data chunks, and wherein the instructions cause the server to:
further store a list of the plurality of video data chunks in the storage.

4. The server of claim 1, wherein the instructions cause the server to:

store metadata associated with the video data in the storage, while storing the video data.

5. The server of claim 4, wherein the instructions cause the server to:

transmit, to the first external device, a plurality of streaming URLs based on a plurality of resolutions, which are included in the metadata, of the video data, through the communication circuit;

receive, from the first external device, a request for streaming video data based on one streaming URL of the plurality of streaming URLs through the communication circuit; and stream, to the first external device, the transcoded video data having a resolution corresponding to the one streaming URL through the communication circuit.

6. The server of claim 4, wherein the instructions cause the server to:

transmit, to the first external device, a plurality of streaming URLs based on a plurality of frame rates, which are included in the metadata, of the video data;

receive, from the first external device, a request for streaming video data based on one streaming URL of the plurality of streaming URLs through the communication circuit; and stream, to the first external device, the transcoded video data having a frame rate corresponding to the one streaming URL.

7. The server of claim 5, wherein the instructions cause the server to:

transmit, to a second external device, a plurality of streaming URLs based on a plurality of resolutions, which are included in the metadata, of the video data;

receive, from the second external device, a request for streaming video data based on one streaming URL of the plurality of streaming URLs; and stream, to the second external device, the pre-transcoded video data having resolution corresponding to the one streaming URL.

8. The server of claim 6, wherein the instructions cause the server to:

transmit, to a second external device, a plurality of streaming URLs based on a plurality of frame rates, which are included in the metadata, of the video data;

receive, from the second external device, a request for streaming video data based on one streaming URL of the plurality of streaming URLs; and stream, to the second external device, the pre-transcoded video data having a frame rate corresponding to the one streaming URL.

9. The server of claim 1, wherein the instructions cause the server to:

store a time point at which the transcoded video data is streamed, in the storage; and delete the transcoded video data from the storage when a specified time is elapsed after a last time point at which the video data is streamed.

10. A method of a server for streaming video data, the method comprising:

storing video data uploaded to a storage without transcoding video data for streaming;

receiving a first request for streaming the video data from a first external device, the first request including an identifier for identifying the video data;

making a first determination regarding whether streaming data associated with the video data is available on the storage, based on a status value corresponding to the identifier included in the first request;

transcoding the video data for streaming, when the status value represents that the transcoding state of the video data corresponding to the identifier represents that the transcoding of the video data is not transcoded;

storing the transcoded video data in the storage;

streaming the transcoded video data, which is stored, to the first external device;

receiving a second request for streaming the video data from a second external device, the second request including the same identifier as the identifier included in the first request;

making a second determination regarding whether the streaming data associated with the video data is available on the storage, based on the status value corresponding to the identifier included in the second request; and streaming pre-transcoded video data, which is stored, to the second external device, when the status value represents that the transcoding state of the video data corresponding to the identifier represents that the transcoding of the video data is in progress or completed.

* * * * *